(12) United States Patent
Boutell et al.

(10) Patent No.: US 11,954,065 B2
(45) Date of Patent: Apr. 9, 2024

(54) DEVICE AND METHOD FOR EXTENDING RETENTION PERIODS OF RECORDS

(71) Applicant: MOTOROLA SOLUTIONS, INC., Chicago, IL (US)

(72) Inventors: Stuart J Boutell, Edinburgh (GB); Chris A Kruegel, Plainfield, IL (US); Stefan Koprowski, Myslenice (PL); Grzegorz Gustof, Myslenice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/655,497

(22) Filed: Mar. 18, 2022

(65) Prior Publication Data

US 2023/0297541 A1    Sep. 21, 2023

(51) Int. Cl.
*G06F 16/10* (2019.01)
*G06F 16/11* (2019.01)

(52) U.S. Cl.
CPC .................. *G06F 16/125* (2019.01)

(58) Field of Classification Search
CPC ..................................................... G06F 16/125
See application file for complete search history.

(56) References Cited

U.S. PATENT DOCUMENTS

| | | | |
|---|---|---|---|
| 5,781,704 A | 7/1998 | Rossmo | |
| 8,424,094 B2 | 4/2013 | Neystadt et al. | |
| 10,298,875 B2* | 5/2019 | Klein | H04N 5/77 |
| 10,878,028 B1* | 12/2020 | Ghare | G06F 16/7867 |
| 2012/0221811 A1* | 8/2012 | Sparkes | G06F 16/125 |
| | | | 711/E12.001 |
| 2016/0064036 A1 | 1/2016 | Feldstein et al. | |
| 2016/0042767 A1 | 2/2016 | Simon et al. | |
| 2016/0286156 A1* | 9/2016 | Kovac | G06F 16/7867 |
| 2017/0127274 A1* | 5/2017 | Lin | H04L 67/63 |
| 2019/0012341 A1* | 1/2019 | Proctor | G06F 16/2477 |
| 2020/0226416 A1* | 7/2020 | Bapat | G06F 16/784 |
| 2022/0012283 A1* | 1/2022 | Richter | G06F 16/7837 |

FOREIGN PATENT DOCUMENTS

KR     102145614 B1     8/2020

OTHER PUBLICATIONS

The International Search Report and the Written Opinion, corresponding patent application No. PCT/US2023/012914 filed Feb. 13, 2023 dated Apr. 25, 2023, all pages.

* cited by examiner

*Primary Examiner* — Belix M Ortiz Ditren
(74) *Attorney, Agent, or Firm* — Raguraman Kumaresan

(57) ABSTRACT

A process of extending retention periods of records. In operation, an electronic computing device identifies a retention period associated with the record. The device obtains information related to a future event. The information includes a time period during which the future event is predicted or scheduled to occur and a location at which the future event is predicted or scheduled to occur. When the device determines that the record is contextually related to the future event based at least in part on the time period or the location of the future event, the retention period associated with the record is extended. The device may also automatically extend retention periods of records based on a number of other retention-related factors associated with the record including recording content, record trustworthiness, recording time, recording location, recording data type, recording source, recording officers' profile and their association, crime statistics, incident severity, and the like.

20 Claims, 5 Drawing Sheets

DEVICE AND METHOD FOR EXTENDING RETENTION PERIODS OF RECORDS

BACKGROUND

Organizations including public safety agencies and private enterprises store large amounts of data records including videos, photos, audios, and text records. Organizations incur cost to retain such records, but they are also concerned about failing to retain information that later becomes required, or retaining information that should have been destroyed as per the organization's policies or to comply with legal requirements. In organizations that use static policies around retention of records, records are typically destroyed after a fixed retention period. However, the status of a record may not always remain the same during its retention period. As an example, in public-safety organizations, a record currently considered to be of no value or non-evidentiary in nature may become later useful or may achieve an evidentiary status based on its correlation to another data record which may be linked to a public-safety event. While users may be able to manually override the fixed retention period to allow for extending the retention of such data records, it is difficult to identify such records from hundreds and thousands of records that may be handled by an organization. Accordingly, the static policies enforced to retain the records or the manual overriding of such static policies to extend retention periods of such records are neither systematic nor reliable.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
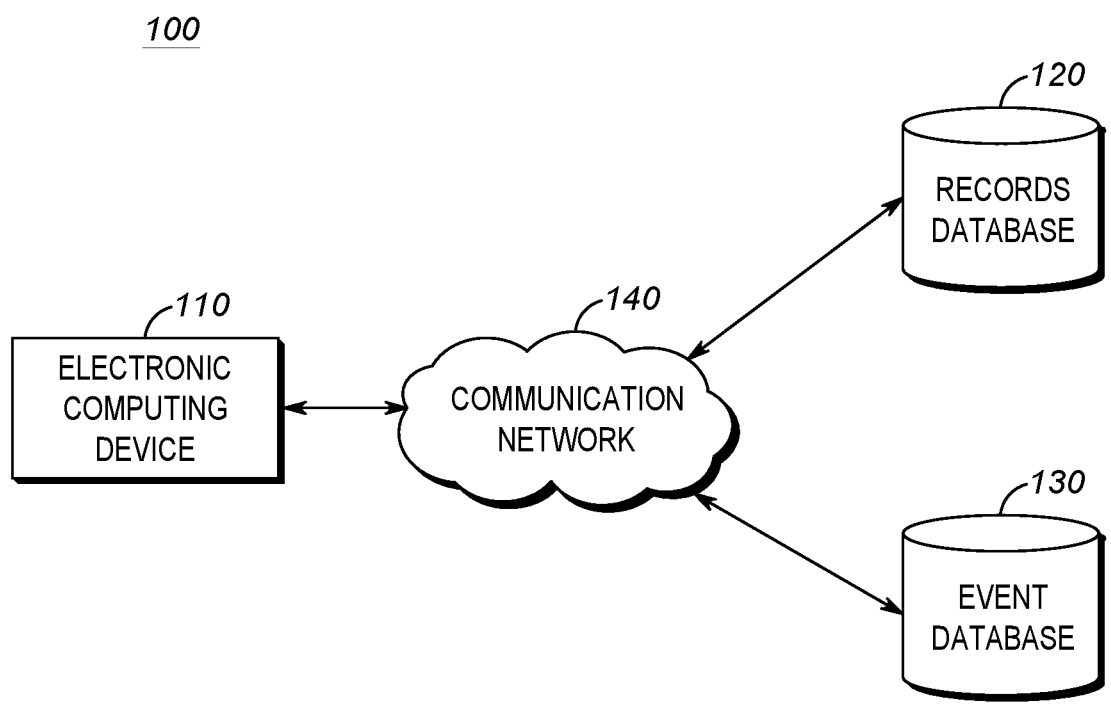
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

A record currently considered to be of no value or non-evidentiary in nature may become later useful or may achieve an evidentiary status based on its correlation to another record which may be linked to an event (e.g., a public-safety incident) being investigated. As an example, assume that, in a digital evidence management system, videos (e.g., videos captured by a surveillance camera or a body-worn camera) that are marked as non-evidentiary are automatically set to be deleted after a fixed retention period (e.g., 30 days) in accordance with the agencies' retention policy. Further, assume that an event (e.g., an event with public-safety implications such as a sports event, campaign, conference, protest or mass gathering, visit by political leaders etc.,) is planned (or predicted, for example, based on historical crime pattern and other social-economic factors) to take place (e.g., after 30 days) at the same location at which the videos set to be deleted (e.g., with the retention periods expiring soon) were also captured. In case a crime-related incident (e.g., shots fired) occurs during the planned or predicted event at a particular location, oftentimes it may be important to look at videos (as well as other digital records such as audios, text etc.,) previously captured (e.g., for up to one month prior to the date of the incident) from the same location. It is possible that the videos previously captured from the same location might provide some clues regarding a perpetrator who carried out the crime-related incident. However, some of the videos previously captured from the same location might have already been deleted (or may be set to be deleted soon) in accordance with their non-evidentiary status and fixed retention periods. Therefore, it is necessary to automatically identify such videos (e.g., videos that will likely achieve an evidentiary status based on their contextual relation to a planned or predicted event) prior to the expiry of their fixed retention periods and further extend their retention periods. Further, it may also be necessary to extend the retention periods for all videos captured from the same location (as well as other locations that may be contextually related to the location of the event) in the run-up to the planned event in case there is a post-event analysis required to verify the evidentiary status of such videos. Accordingly, there is a need for an improved device and process for automatically extending retention periods for records that are contextually related to a future predicted or scheduled event and various other retention-related factors.

One embodiment provides a method of extending retention periods of records. The method comprises: identifying, at an electronic computing device, a retention period associated with an electronically stored record; obtaining, at the electronic computing device, information related to a future event, the information including a time period during which the future event is predicted or scheduled to occur and a location at which the future event is predicted or scheduled to occur; determining, at the electronic computing device, that the electronically stored record is contextually related to the future event based at least in part on the time period or the location of the future event; and extending, at the electronic computing device, the retention period associated with the electronically stored record based on the determination that the electronically stored record is contextually related to the future event.

Another embodiment provides an electronic computing device. The electronic computing device comprises: a communications interface; and an electronic processor communicatively coupled to the communications interface. The electronic processor is configured to: identify a retention period assigned to retain an electronically stored record; obtain, via the communications interface, information related to a future event, the information including a time period during which the future event is predicted or scheduled to occur and a location at which the future event is predicted or scheduled to occur; determine that the electronically stored record is contextually related to the future event based at least in part on the time period or the location of the future event; and extend the retention period associated with the electronically stored record based on the determination that the electronically stored record is contextually related to the future event.

A further embodiment provides a method of extending retention periods of records. The method comprises: determining, at an electronic computing device, that a first video stream captured by an untrusted camera is marked as an evidentiary material, the first video stream associated with metadata identifying a time and location at which the first video stream was captured by the untrusted camera; identifying, at the electronic computing device, a second video stream captured by a trusted camera substantially at the same time and location at which the first video stream was captured by the untrusted camera; determining, at the electronic computing device, that the second video stream captured by the trusted camera is marked for deletion after a retention period assigned to the second video stream; detecting, at the electronic computing device, one or more persons or objects in the first video stream captured by the untrusted camera; determining, at the electronic computing device, whether the one or more persons or objects correlate with one or more persons or objects detected in the second video stream captured by the trusted camera; and extending the retention period assigned to the second video stream captured by the trusted camera when it is determined that the one or more persons or objects detected in the first video stream captured by the untrusted camera correlate with the one or more persons or objects detected in the second video stream captured by the trusted camera.

Each of the above-mentioned embodiments will be discussed in more detail below, starting with example system and device architectures of the system in which the embodiments may be practiced, followed by an illustration of processing blocks for achieving an improved technical method, device, and system for extending retention periods of records. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an electronic computing device 110 configured to automatically extend retention periods assigned to one or more electronically stored records (also referred herein as "records" or "electronic records") maintained by one or more agencies in one or more records databases 120. An agency is an organizational entity that may store, retrieve, and/or process various types of electronic records stored in the records database 120 related to the organization's goals, activities, resources, and the like. In some embodiments, an agency may represent a private enterprise organization such as press, media, utilities, retail, healthcare, manufacturing, oil/gas, electric, private security, or other business. In other embodiments, an agency may represent a public organization such as a public-safety agency (e.g., police, fire, emergency medical service), governmental entity (e.g., court, city administration), and the like. The one or more records databases 120 may be implemented using any type of storage device, storage server, storage area network, redundant array of independent discs, cloud storage device, or any type of local or network-accessible data storage device configured to store data records for access by computing devices. In some embodiments, the one or more records databases 120 are commercial cloud-based storage devices. In some embodiments, the one or more records databases 120 are housed on suitable on-premise database servers or edge computing devices that may be owned and/or operated by one or more of public-safety or private agencies. The one or more records databases 120 may be maintained by third parties as well. The electronic records may be stored at the one or more records databases 120 in any suitable format or data type, for example, video, image, audio, text, or combination thereof. As an example, the electronically stored record may represent an image or a video recorded by a body-worn camera, an audio (e.g., talk group conversations) recorded by a land mobile radio, or text data (e.g., an incident report) entered by a public-safety officer on a mobile device. In accordance with some embodiments, the electronic records stored at the records database 120 may be associated with different agencies (e.g., police department, city administration, court etc.). In accordance with some embodiments, the electronic computing device 110 obtains permission to access and process all or subset of electronic records maintained in one or more records databases 120 and owned by one or more agencies for the purpose of automatically extending retention periods for records stored in the records database 120.

In accordance with some embodiments, the electronic records stored at the records database 120 may include evidentiary and non-evidentiary records. The evidentiary records may include images, videos, audios, or text that are assigned an evidentiary value based on their association to one or more incidents (e.g., public-safety incidents) that have already occurred. In contrast, the non-evidentiary records, which may similarly include images, videos, audios, or text, are records that are determined to have no evidentiary value. In other words, the non-evidentiary records may represent records that are not yet linked to any active incidents (e.g., public-safety incidents being investigated or prosecuted). As used herein, the term "incident" may refer to an event, occurrence, or situation that an agency has been tasked to resolve (e.g., a traffic accident, public disturbance, medical emergency, fire, broken water meter or power line, etc.). In accordance with some embodiments, the electronic computing device 110 or another computing device operated by an agency may automatically assign retention periods to electronic records based on their evidentiary or non-evidentiary values. As an example, a computing device may be configured to enforce a pre-programmed or standard retention policy that may require automatically assigning longer retention periods to evidentiary records in comparison to retention periods assigned to non-evidentiary records. In accordance with embodiments, the electronic computing device 110 is configured to override the pre-programmed or standard retention policy by automatically extending the retention periods assigned to certain records (e.g., non-evidentiary records) in response to a determination that the non-evidentiary records are contextually related to a future event (e.g., a planned or predicted event) as well as based on various other retention-related factors.

In accordance with some embodiments, the electronic computing device 110 has access to an event database 130. The event database 130 includes information related to planned events (e.g., an event with public-safety implications such as a sports event, campaign, conference, protest or mass gathering, visit by political leaders etc.,) as well as information about historical events (e.g., crime data) that may be used to predict occurrence of similar events in the future. The information related to planned or scheduled events may include time, location, and type of planned or scheduled events. The information related to historical events may similarly include time, location, and type of historical events as well as links to records (e.g., incident records) that were captured in relation to the historical events. In accordance with some embodiments, the electronic computing device 110 may predict the occurrence of a future event by analyzing information related to the historical events. Similar to the records database 120, the event database 130 may be implemented using any type of storage device, storage server, storage area network, redundant array of independent discs, cloud storage device, or any type of local or network-accessible data storage device configured to store data records for access by computing devices. In some embodiments, the event database 130 is a commercial cloud-based storage device. In some embodiments, the event database 130 is housed on a suitable on-premise database server or edge computing device that may be owned and/or operated by one or more of public-safety or private agencies. The event database 130 may be maintained by third parties as well. In some embodiments, the records database 120 and event database 130 may be hosted on the same storage device or infrastructure.

In accordance with embodiments, the electronic computing device 110 is implemented as a standalone electronic device or alternatively integrated into one or more computing devices (e.g., computing devices operated by one or more agencies) operating within the system 100. The electronic computing device 110 may access the records database 120 and event database 130 via one or more communication networks 140. The communication network 140 includes wireless and wired connections. For example, the communication network 140 may be implemented using a wide area network, such as the Internet, a local area network, such as a Wi-Fi network, and personal area or near-field networks, for example a Bluetooth™ network. Portions of the communications network 140 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

Figure 2:
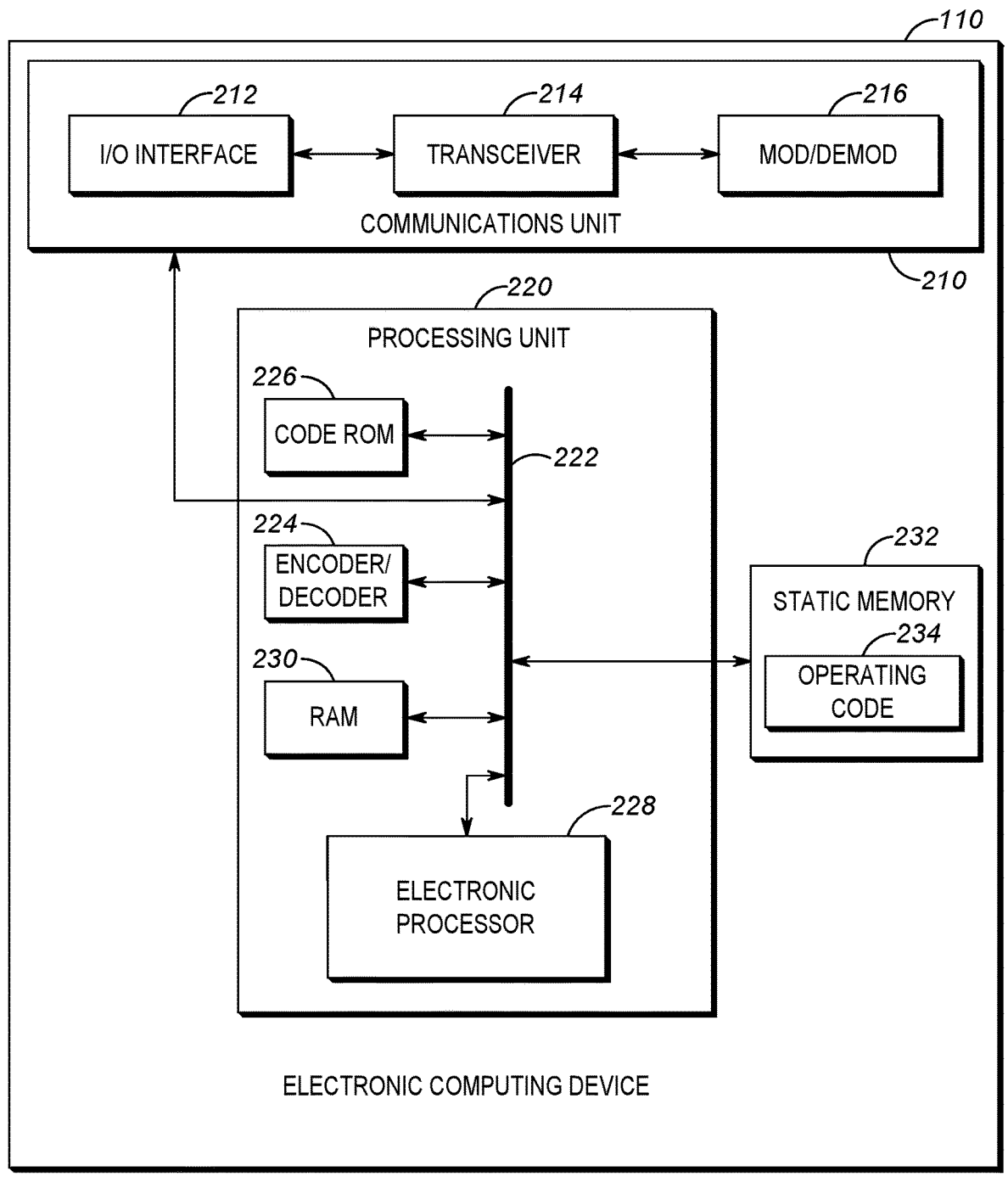
FIG. 2 is a block diagram of an electronic computing device shown in FIG. 1 in accordance with some embodiments.

FIG. 2 is an example functional block diagram of an electronic computing device 110 operating within the system 100 in accordance with some embodiments. The electronic computing device 110 may be embodied in computing devices not illustrated in FIG. 1, and/or may be a distributed computing device across two or more of the foregoing (or multiple of a same type of one of the foregoing) and linked via a wired and/or wireless communication link(s). In one embodiment, one or more functions of the electronic computing device 110 may be executed at one or more other computing devices (e.g., a device or infrastructure hosting electronic records stored at the records database 120 and/or event database 130 etc.,) operating within the system 100. While FIG. 2 represents an electronic computing device 110 described above with respect to FIG. 1, depending on the type of the computing device, the electronic computing device 110 may include fewer or additional components in configurations different from that illustrated in FIG. 2.

As shown in FIG. 2, the electronic computing device 110 includes a communications interface 210 coupled to a common data and address bus 222 of a processing unit 220. The communications interface 210 sends and receives data to and from other devices (e.g., records database 120) in the system 100. The communications interface 210 may include one or more wired and/or wireless input/output (I/O) interfaces 212 that are configurable to communicate with other devices in the system 100. For example, the communications interface 210 may include one or more wireless transceivers 214, such as a digital mobile radio (DMR) transceiver, a project 25 (P25) transceiver, a Bluetooth transceiver, a Wi-Fi transceiver perhaps operating in accordance with an IEEE 802.11 standard (for example, 802.11a, 802.11b, 802.11g), a long term evolution (LTE) transceiver, a WiMAX transceiver perhaps operating in accordance with an IEEE 802.16 standard, and/or another similar type of wireless transceiver configurable to communicate via a wireless radio network. The communications interface 210 may additionally or alternatively include one or more wireline transceivers 214, such as an Ethernet transceiver, a universal serial bus (USB) transceiver, or similar transceiver configurable to communicate via a twisted pair wire, a coaxial cable, a fiber-optic link, or a similar physical connection to a wireline network. The transceiver 214 is also coupled to a combined modulator/demodulator 216.

The processing unit 220 may include an encoder/decoder 224 with a code Read Only Memory (ROM) 226 coupled to the common data and address bus 222 for storing data for initializing system components. The processing unit 220 may further include an electronic processor 228 (for example, a microprocessor, a logic circuit, an application-specific integrated circuit, a field-programmable gate array, or another electronic device) coupled, by the common data and address bus 222, to a Random Access Memory (RAM) 230 and a static memory 232. The electronic processor 228 may generate electrical signals and may communicate electrical signals through the communications interface 210, such as for receipt by the records database 120.

Figure 3:
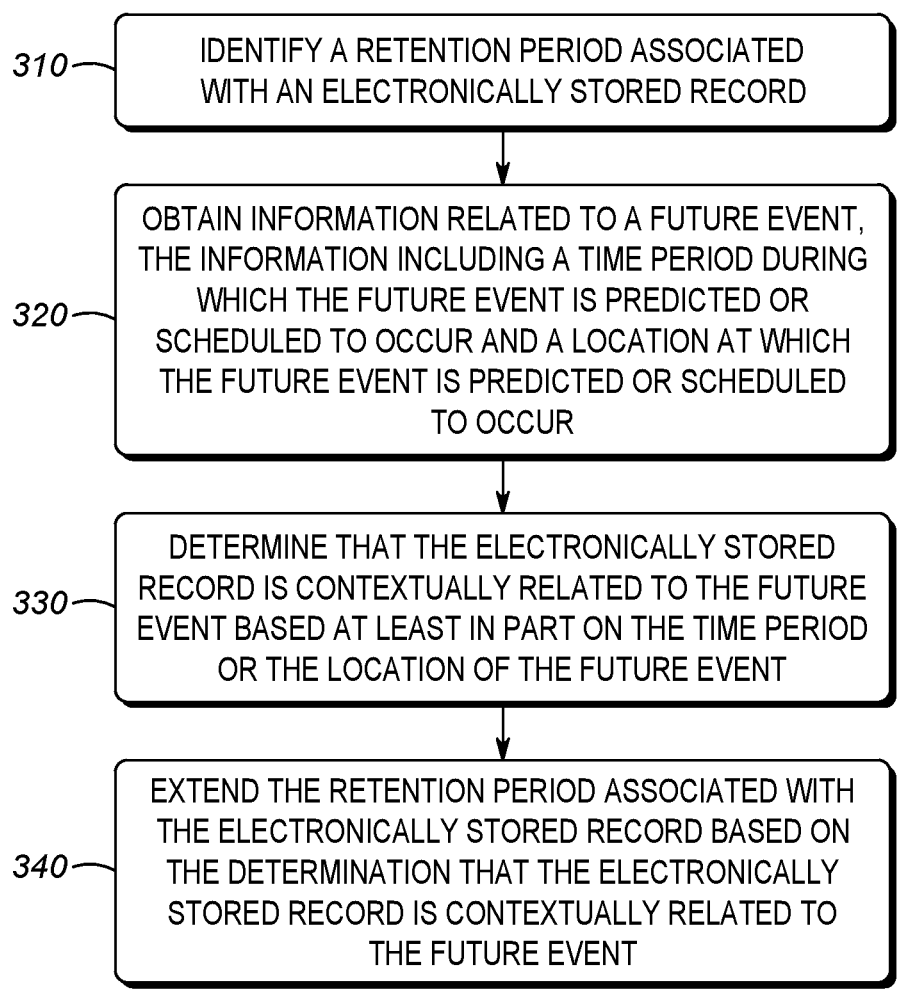
FIG. 3 illustrates a flowchart of a process for extending retention periods of records in accordance with some embodiments.
Figure 4:
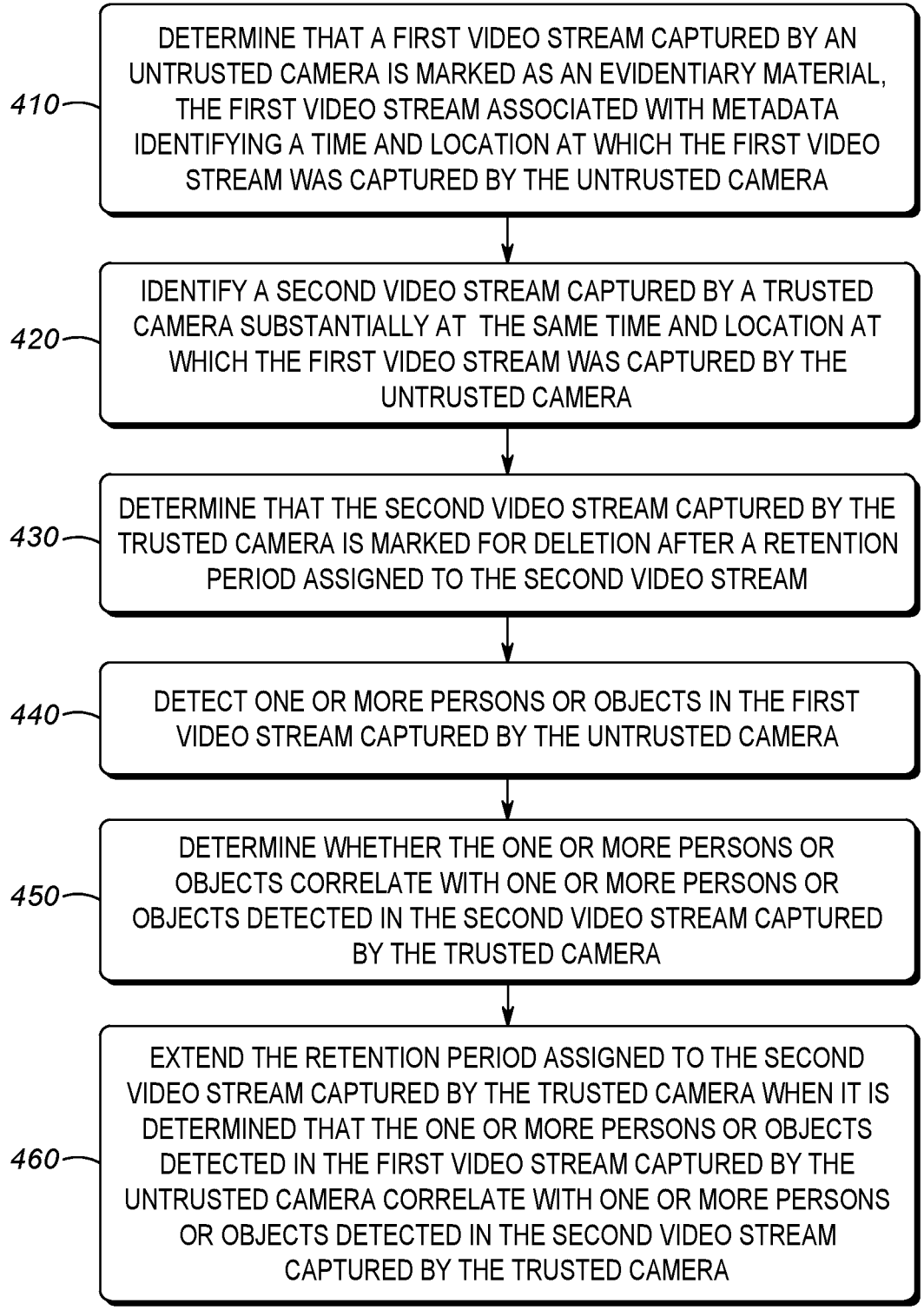
FIG. 4 illustrates a flowchart of another process for extending retention periods of records in accordance with some embodiments.

Static memory 232 may store operating code 234 for the electronic processor 228 that, when executed, performs one or more of the blocks set forth in FIGS. 3 and 4 and the accompanying text(s). The static memory 232 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. In accordance with embodiments, the static memory 232 may further store information required for the electronic computing device 110 to extend retention periods assigned to electronic records maintained by one or more agencies in one or more records databases 120. For example, the electronic computing device 110 may download one or more electronic records from the one or more records databases 120 and further temporarily store the electronic records at the static memory 232 during execution of the processes 300, 400 respectively set forth in FIGS. 3 and 4. In accordance with some embodiments, the electronic computing device 110 employs one or more analytics engines (e.g., a video analytics engine, audio analytics engine, natural language processing engine etc.,) to process the electronic records and to recognize information related to persons or objects captured in the electronic records. In one embodiment, the executable code corresponding to the one or more analytics engines may be stored at the static memory 232. In another embodiment, the analytics engines may reside in a computing device other than the electronic computing device 110. In this case, the electronic computing device 110 may request a computing device hosting the analytics engines to analyze the electronic records and provide analytics data corresponding to persons or objects captured within the electronic records to the electronic computing device 110.

Turning now to FIG. 3, a flowchart diagram illustrates a process 300 for extending retention periods of records. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 228. In accordance with some embodiments, the process 300 is executed by an electronic computing device 110 employed by or associated with one or more agencies requesting to perform automated extension of retention periods corresponding to records that are contextually related to a future event.

The electronic computing device 110 may execute the process 300 at power-on, at some predetermined periodic time period thereafter, in response to a trigger raised locally at the computing device 110 via an internal process or via an input interface or in response to a trigger from an external device to which the electronic computing device 110 is communicably coupled, among other possibilities. As an example, the electronic computing device 110 is programmed to execute the process 300 when a request to perform automated extension of retention periods for records stored at the records database 120 is received from a user affiliated with an agency.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

At block 310, the electronic computing device 110 begins to execute the process 300 by identifying a retention period associated with an electronically stored record (e.g., a record stored at the records database 120). As used herein, the term "record" refers to one of video, audio, text, or any other data stored in any suitable data format or structure. The record may also refer to digital description or representation of physical items (e.g., vehicle, firearm) that are collected from a scene. In one embodiment, the electronic computing device 110 periodically (or in response to receiving information related to a planned or future event) processes all electronic records stored at the records database 120 to identify their retention periods and further determine whether retention periods assigned to electronic records need to be updated in accordance with the process 300. In another embodiment, the electronic computing device 110 executes block 310 to identify a retention period associated with a particular electronically stored record in response to an input from a user associated with an agency that maintains the particular electronically stored record. In another embodiment, the electronic computing device 110 executes block 310 to identify a retention period associated with particular electronic records that have been tagged as retention type records i.e., records that need to be processed for retention as per the agency's retention policy. The retention period may be assigned to each electronic record stored at the records database 120 based on an agency's standard retention policy. In one embodiment, an agency's standard retention policy may require assignment of longer retention periods to evidentiary records in comparison to retention periods assigned to non-evidentiary records. In this embodiment, the electronic computing device 110 executes process 300 for a subset of electronic records stored at the records database 120, where each record in the subset of electronic records has a non-evidentiary status. In other words, in this embodiment, the electronic computing device 110 executes block 310 to identify retention periods only for non-evidentiary records and to further determine whether retention periods assigned to non-evidentiary records need to be extended in accordance with the process 300. The retention period assigned to each electronic record may be stored in any suitable data structure or format. For example, the retention period assigned to an electronic record may be included in metadata associated with the electronic record. In this case, the electronic computing device 110 may identify the retention period assigned to a particular electronically stored record by processing the metadata stored corresponding to the particular electronically stored record.

At block 320, the electronic computing device 110 obtains information related to a future event. The information related to a future event may include a time period (e.g., date and time) during which the future event is predicted or scheduled to occur and a location (e.g., street address, geographic coordinates, landmarks etc.,) at which the future event is predicted or scheduled to occur. The information related to a future event may also include a type or severity of future event (e.g., sports event, political event, protest etc.,) as well as the type or severity of public-safety incidents that may be expected or predicted to take place at the time of the future event. As an example, the electronic computing device 110 may subscribe to one or more event databases 130 to automatically receive information related to particular types of events (e.g., a public event in which a large gathering of people and/or security-protected persons are expected to participate) that have been scheduled or planned in a pre-defined geographical area (e.g., areas that are within the jurisdiction of an agency that maintains the particular electronically stored record). In one embodiment, the electronic computing device 110 may have access to one or more incident databases (not shown) associated with an agency that maintains the particular electronically stored record. The electronic computing device 110 may periodically or in response to one or more predetermined triggering events (e.g., responsive to generation of a new incident record) may perform an event prediction analysis to predict one or more events (e.g., crimes) that are likely to occur in the future. In this embodiment, as an example, the electronic computing device 110 may perform the event prediction analysis by processing information (e.g., type of crime, location of crime, time of the crime, etc.,) included in the incidents records stored in one or more incident databases to produce one or more output predictions indicating the likelihood of crime occurring based on similar reported crime incidents within a specified area and/or time.

At block 330, the electronic computing device 110 determines that the electronically stored record is contextually related to the future event based at least in part on the information (e.g., time, location, and type of the event) related to the future event. In order to determine that the electronically stored record is contextually related to the future event, the electronic computing device 110 may first determine that the electronically stored record contains data captured corresponding to a first event (e.g., an election campaign in which a security-protected person has participated in the past) and further determine that the record is contextually related to the future event when the first event is of the same type as the future event (e.g., a planned election campaign in which the same security-protected person is expected to participate). In another example, the electronic computing device 110 may determine that the record is contextually related to the future event when the electronically stored record contains data (e.g., video) captured corresponding to one or more persons or objects of interest (e.g., persons who wore clothes or attires identifying or representing a particular organization) and further when the same one or more persons or objects of interest are predicted or scheduled to participate in a future event (e.g., a planned protest in which persons with similar clothes or attires identifying or representing the same organization are expected to participate). In another example, the electronic computing device 110 identifies a data source (e.g., a surveillance camera or a body-worn camera) from which data (e.g., video) included in the electronically stored record was captured and determines that the record is contextually related to the future event when the same data source (i.e., same surveillance camera or body-worn camera) is also deployed (or is assigned to be deployed) at the location of the future event. In another example, the electronic computing device 110 may determine that the record is contextually related to a future event when data included in the electronically stored record includes one or more keywords (e.g., time of event, location of event, type of event, objects of interest, persons expected to participate in the event etc.,) related to the future event. In this example, the electronic computing device 110 may retrieve the one or more keywords by analyzing data (e.g., audio or text data) included in the electronically stored data, for example, using a natural language processing (NLP) engine. Other ways of determining a contextual relation between the electronically stored record and the future event exist as well.

At block 340, the electronic computing device 110 extends the retention period (identified at block 310) associated with the electronically stored record based on the determination at block 330 that the electronically stored record is contextually related to the future event. In accordance with some embodiments, the electronic computing device 110 is programmed to automatically override an agency's standard retention policy to extend the retention period assigned to the electronically stored record that is contextually related to the future event. In one embodiment, the electronic computing device 110 assigns an extended retention period to the electronically stored record, such that, the extended retention period does not expire until after a predetermined period after the occurrence of the future event. The predetermined period corresponds to a period (e.g., determined by an agency maintaining the data record) that would be sufficient (e.g., 30 days) for performing a post-event (i.e., after occurrence of the future event) analysis of the electronically stored data in relation to any other data expected to be captured in relation to the same future event. In accordance with embodiments, the extended retention period is longer than the retention period (identified at block 310) previously assigned to the electronically stored record. The electronic computing device 110 may update the metadata associated with the electronically stored record to reflect the extended retention period assigned to the electronically stored record. In another embodiment, the electronic computing device 110 assigns an extended retention period to the electronically stored record, such that, the extended retention period will expire prior to a predetermined period (e.g., 2 weeks before the event) before the expected occurrence of the future event. In other words, in this embodiment, the electronically stored record is marked for deletion prior to the occurrence of the event. In a further embodiment, when the electronic computing device 110 determines that the electronically stored record is contextually related to the future event, the electronic computing device 110 does not automatically assign an extended retention period and instead sends a notification to one or more agency users authorized to approve the extension of the retention period for the record. The notification may include information indicating one or more of: content of the record, retention period currently associated with the record, information (e.g., time, location, event type etc.,) related to the future event, contextual relation between the record and the future event, and a recommended period for extending the retention of the record. In this embodiment, the electronic computing device 110 assigns the extended retention period (e.g., by updating the metadata associated with the record) for the record after receiving a response indicating approval to extend the retention period of the record from one or more of the notified users.

In one embodiment, prior to extending (at block 340) the retention period associated with an electronically stored record which is determined to be contextually related to the future event, the electronic computing device 110 may first determine whether a duration of the retention period already exceeds an extended retention period that may be assigned to the record based on its contextual relation to the future event. As an example, the electronic computing device 110 determines whether a duration of the retention period already exceeds a predefined time period after the expected occurrence of the future event. In other words, the electronic computing device 110 determines whether the electronically stored record will still be available for performing post-event analysis of any data that may be captured in relation to the expected occurrence of the future event. If the electronic computing device 110 determines that the duration of the retention period already exceeds the predefined time period after the expected occurrence of the future event, then the electronic computing device 110 refrains from extending the retention period (i.e., retention period identified at block 310) associated with the electronically stored data. On the other hand, if the electronic computing device 110 determines that the duration of the retention period currently assigned to the electronically stored data does not exceed the predefined time period after the expected occurrence of the future event, then the electronic computing device 110 proceeds to block 340 to extend the retention period associated with the electronically stored record.

In one embodiment, prior to extending the retention period associated with an electronically stored record (referred herein as "a first electronically stored record") which is determined to be contextually related to the future event, the electronic computing device 110 may first determine whether the first electronically stored record is related to a second electronically stored record (e.g., another record maintained by the same agency or another agency) for which a retention period has previously been extended, for example, based on the same or different future event, in accordance with the same process 300. In this embodiment, the electronic computing device 110 further determines whether the second electronically stored record has been marked as an evidentiary material or a non-evidentiary material. An electronic record which has previously been assigned an extended retention period may be marked as an evidentiary material when it achieves an evidentiary status after an occurrence of a planned or predicted event (which formed the basis for extending the retention period). As an example, the electronic computing device 110 may determine that evidence obtained in relation to a public-safety incident which occurred during the planned or predicted event has strong correlation with data included in the second electronically stored record which has previously been assigned an extended retention period. In this case, the electronic computing device 110 may automatically mark the second electronically stored record as an evidentiary material. Alternatively, an electronic record which has previously been assigned an extended retention period based on its contextual relation may be marked as a non-evidentiary material if the electronic computing device 110 determines that the electronic record is no longer contextually related to the event based on data captured after occurrence of the future event. In any case, when it is determined that the second electronically stored record has been marked as an evidentiary material, the electronic computing device 110 may automatically extend the retention period of the first electronically stored record (at block 340) by a first duration of time. On the other hand, when it is determined that the second electronically stored record has been marked as a non-evidentiary material, the electronic computing device 110 may automatically extend the retention period of the first electronically stored record (at block 340) by a second duration of time shorter than the first duration of time. In another embodiment, the electronic computing device 110 is programmed to extend the retention period of the first electronically stored record at block 340 only when it is determined that the second electronically stored record has been marked as an evidentiary material. In this embodiment, the electronic computing device 110 refrains from extending the retention period associated with the first electronically stored record when it is determined that the second electronically stored record has been marked as a non-evidentiary material.

In accordance with some embodiments, after extending a retention period (at block 340) for a particular electronically stored record, the electronic computing device 110 may automatically extend retention periods for other electronically stored records (including electronically stored records that may be captured in the future) that may be contextually related to the particular electronically stored record. In one embodiment, the electronic computing device 110 identifies a data source (e.g., a surveillance camera) from which data (e.g., video) included in the electronically stored record (i.e., record for which an extended retention period is assigned at block 340) was captured. In this embodiment, the electronic computing device 110 automatically extends, in response to determining that the electronically stored record is contextually related to the future event, a retention period associated with any current and future electronically stored records including any data captured by the data source at least until after a predefined period (e.g., 30 days) after the expected occurrence of the future event. In another embodiment, the electronic computing device 110 identifies one or more data sources that are already deployed (e.g., surveillance camera) or assigned to be deployed (e.g., body-worn camera operated by an officer) within a predefined geographical area (e.g., an area within 1 mile) relative to one or more locations of the future event (i.e., an event which triggered extension of retention period for the electronically stored record). The predefined geographical area may also relate to geographical areas that are spatially separated from a particular location of the future event, but may still be contextually related (e.g., when a same person is expected to visit both the locations) to the particular location of the future event. In this embodiment, the electronic computing device 110 automatically extends a retention period associated with any current and future electronically stored records including any data captured by the one or more data sources at least until after a predefined period after the expected occurrence of the future event. In these embodiments, the electronic computing device 110 may update an agency's standard retention policy to require automatic extension of all current and future electronically stored records including any data (captured by particular data sources, or captured in particular locations, or data linked to particular type of incidents) at least until after a predefined period after expected occurrence of the future event.

In accordance with some embodiments, after extending a retention period for a particular electronically stored record at block 340, the electronic computing device 110 continues to track new information that is received (e.g., from the event database 130) in relation to the future event which formed the basis for extending the retention period. For example, the electronic computing device 110 may receive information related to change in one or more of time, location, and/or type of the future event. In one embodiment, if the electronic computing device 110 receives information indicating that the planned event is postponed to a later time or date, then the electronic computing device 110 may further extend the retention period of the electronically stored record, such that, the further extended retention period does not expire until after a predetermined time period after the occurrence (i.e., now expected to occur at a later time or date) of the future event. If the electronic computing device receives information indicating that the planned event is moved to a different location, then the electronic computing device 110 may re-execute block 330 to determine whether the electronically stored record is still contextually related to the future event (i.e., event moved to a new location). If the electronic computing device 110 determines that the electronically stored record is no longer contextually related to the future event, the electronic computing device 110 may cancel the extended retention period assigned to the electronically stored record and further revert to a previous retention period (i.e., retention period identified at block 310) or if the previous retention period has already expired, the electronic computing device 110 may mark (e.g., by sending a notification to a user authorized by the agency) the electronically stored record for immediate destruction or may assign a new extended period (in accordance with the agency's retention policy) that may be shorter than an extended period previously assigned at block 340. In this embodiment, when information indicating change in location of the future event is received, the electronic computing device 110 is automatically triggered to execute process 300 in relation to other electronic records stored at the records database 120. For example, the electronic computing device 110 may determine that a second electronically stored record (i.e., another record stored at the records database 120) is contextually related to the updated event (i.e., because of the change in location of the event). In this case, the electronic computing device 110 may extend a retention period associated with the second electronically stored record based on the determination that the second electronically stored record is contextually related to the future event. In another embodiment, if the electronic computing device 110 receives information indicating cancellation of the planned event (or in case of a predicted event, if the prediction is no longer valid), the electronic computing device 110 may cancel the extended retention period assigned to the record and further revert to a previous retention period (i.e., retention period identified at block 310) or if the previous retention period has already expired, the electronic computing device 110 may mark (e.g., by sending a notification to a user authorized by the agency) the electronically stored record for immediate destruction or may assign a new extended period that may be shorter than an extended period previously assigned at block 340.

In accordance with embodiments, after extending a retention period associated with a particular electronically stored record, the electronic computing device 110 may receive information indicating that the future event (i.e., an event which formed the basis for extending the retention period of the particular electronically stored record) has actually occurred. In response to detecting the occurrence of the future event, the electronic computing device 110 analyzes data (e.g., video) captured by one or more data sources (e.g., surveillance camera/body-worn camera) deployed within a geographical area relative to the location of the event. The electronic computing device 110 may, in accordance with block 330, further determine whether the analyzed data (i.e., data captured in relation of the occurrence of the event) is contextually related to the particular electronically stored record (i.e., record for which an extended retention period is assigned at block 340). When it is determined that the analyzed data is contextually related to data included in the particular electronically stored record, the electronic computing device 110 may maintain the extended retention period assigned to the electronically stored record. In one embodiment, when it is determined that the analyzed data is contextually related to data included in the particular electronically stored record, the electronic computing device 110 may further extend the retention period (i.e., an extension period longer than the extended retention period assigned at block 340) assigned to the particular electronically stored record. Alternatively, when it is determined that the analyzed data is not contextually related to data included in the particular electronically stored record, the electronic computing device 110 may cancel the extended retention period assigned to the record and further revert to a previous retention period (i.e., retention period identified at block 310) or if the previous retention period has already expired, the electronic computing device 110 may mark (e.g., by sending a notification to a user authorized by the agency) the electronically stored record for immediate destruction or may assign a new extended period that may be shorter than an extended period previously assigned at block 340.

In accordance with embodiments, the electronic computing device 110 repeats execution of the process 300 similarly for other electronic records stored at the records database 120 for the purpose of automatically extending retention periods assigned to such electronic records.

Turning now to FIG. 4, a flowchart diagram illustrates another process 400 for extending retention periods of records. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 400 via an electronic processor 228. In accordance with some embodiments, the process 400 is executed by an electronic computing device 110 employed by or associated with one or more agencies requesting to perform automated extension of retention periods.

The electronic computing device 110 may execute the process 400 at power-on, at some predetermined periodic time period thereafter, in response to a trigger raised locally at the computing device 110 via an internal process or via an input interface or in response to a trigger from an external device to which the electronic computing device 110 is communicably coupled, among other possibilities. As an example, the electronic computing device 110 is programmed to execute the process 400 when a request to perform automated extension of retention periods for records stored at the records database 120 is received from a user affiliated with an agency. As another embodiment, the electronic computing device 110 is programmed to execute the process 400 whenever video evidence is captured from a camera that is detected to be untrustworthy.

The process 400 of FIG. 4 need not be performed in the exact sequence as shown and likewise various blocks may be performed in different order or alternatively in parallel rather than in sequence. The process 400 may be implemented on variations of the system 100 of FIG. 1 as well.

Figure 5:
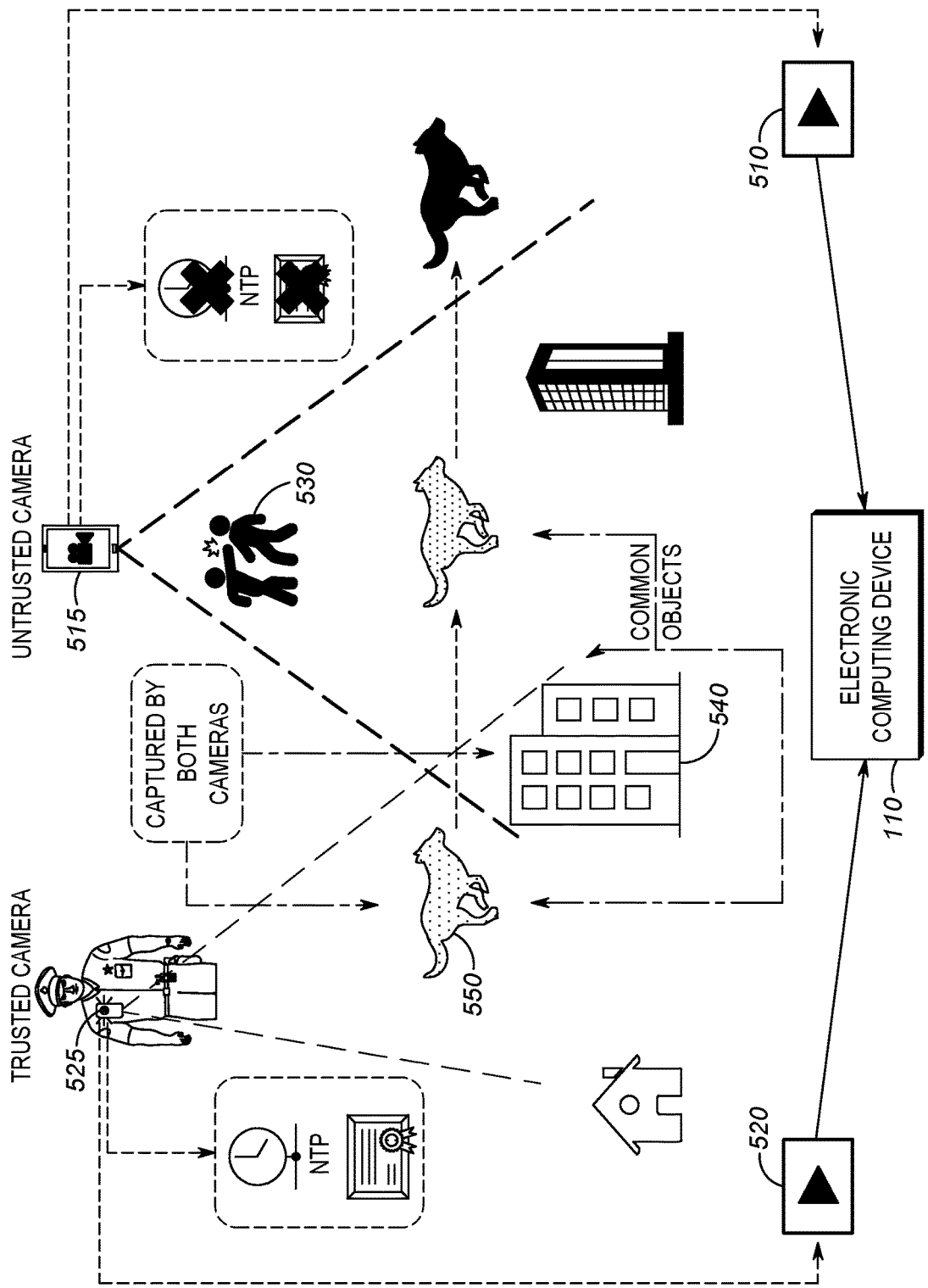
FIG. 5 illustrates an example scenario in which the process shown in FIG. 4 can be advantageously implemented in accordance with some embodiments.

The process 400 will be described below with reference to an example scenario 500 shown in FIG. 5. In the example scenario 500 illustrated in FIG. 5, assume a public-safety incident 530 (e.g., aggravated battery) has occurred at a location where cameras 515, 525 were deployed. Further assume that the cameras 515, 525 had overlapping field-of-views at the time of occurrence of the public-safety incident 530, but the public-safety incident 530 was captured only by the camera 515. Because of the overlapping field-of-views, it is possible that, at the time of occurrence of the public-safety incident 530, one or more objects 540, 550 captured by the camera 515 were also captured by the camera 525. FIG. 5 further shows an electronic computing device (similar to electronic computing device 110 shown in FIG. 1) that is configured to access video streams (which may be stored as electronic records in records database 120 shown in FIG. 1) captured by different data sources including cameras 515, 525. As shown in FIG. 5, the electronic computing device 110 receives a first video stream 510 captured by the camera 515 and a second video stream 520 captured by the camera 525. In accordance with embodiments, the electronic computing device 110 is programmed to detect whether a particular video stream is received from a trusted source or an untrusted source by processing metadata (e.g., certificate) associated with the video stream. In the example shown in FIG. 5, the video stream 520 may be associated with an electronic certificate indicating that the video stream 520 is captured by a camera 525 which is operated, owned, or controlled by an authorized agency (e.g., public-safety agency) and therefore can be trusted. On the other hand, the video stream 510 may be associated with an electronic certificate (or no certificate at all) indicating that the video stream is captured by a camera 525 which is operated, owned, or controlled by a private individual or agency and therefore cannot be trusted without further corroboration. In the example shown in FIG. 5, since the first video stream 510 is captured by an untrusted camera 515 (e.g., due to the camera 515 not being associated with a public-safety agency), the first video stream 510 capturing evidentiary information corresponding to the public-safety incident 530 may need to be corroborated using information (e.g., common objects 540, 550) captured by trusted sources such as the trusted camera 525. However, in the example shown in FIG. 5, since trusted camera 525 has not captured any evidentiary information (i.e., since public-safety incident 530 was not directly captured by the trusted camera 525), the second video stream 520 captured by the first video stream may be marked as a non-evidentiary material. As previously described, an agency retention policy may require assignment of a shortened retention period for a record marked as a non-evidentiary material in comparison to another record marked as an evidentiary material. Accordingly, the second video stream may be deleted in accordance with the shortened retention period assigned to the second video stream. However, there is a need to override the agency retention policy and to further extend the retention period assigned to the second video stream 520 to ensure that the second video stream 520 will be available for proving the trustworthiness of the video stream 510 captured by the untrusted camera 515. A process 400 for extending a retention period for a video stream captured by a trusted camera (e.g., camera 525) based on a need to prove trustworthiness of an evidentiary-marked video stream captured by an untrusted camera (e.g., camera 525) is described below with reference to FIG. 4.

At block 410, the electronic computing device 110 determines that a first video stream (e.g., video stream 510) captured by an untrusted camera (e.g., camera 515) is marked as an evidentiary material. As an example, the first video stream may correspond to a multimedia evidence submitted through a tip submission system and further linked to one or more incident records associated with a public-safety incident (e.g., public-safety incident 530) reported via, for example, a 911 call. The electronic computing device 110 may retrieve the first video stream from one or more incident records stored at the records database 120. The first video stream is associated with metadata identifying a time and location at which the first video stream was captured by the untrusted camera. In accordance with embodiments, the electronic computing device 110 may begin to execute process 400 each time a video stream captured by an untrusted camera is marked as an evidentiary material i.e., when there is a need to prove trustworthiness of a video stream captured by an untrusted camera.

At block 420, the electronic computing device 110 identifies a second video stream (e.g., video stream 520) captured by a trusted camera (e.g., camera 525) substantially at the same time and location at which the first video stream was captured by the untrusted camera. In accordance with some embodiments, the electronic computing device 110 has access to metadata (i.e., time and location) associated with video streams stored at the records database 120. The electronic computing device 110 may search the metadata associated with video streams captured by the trusted camera to identify at least one video stream (referred herein as a second video stream) that was captured substantially at the same time and/or at the same location as the first video stream.

At block 430, the electronic computing device 110 determines that the second video stream captured by the trusted camera is marked for deletion after a retention period (which in some cases may correspond to a retention period already extended based on a correlation between the second video stream and another incident) assigned to the second video stream. If the second video stream is already marked as an evidentiary material based on its association with another incident, then it is possible that a retention period for the second video stream might have already been extended based on the other incident. In this case, if the detection of the current incident requires further extension of the retention period of the second video stream, then the electronic computing device 110 executes the remainder of the process 400 to further extend the retention period of the second video stream. On the other hand, if the second video stream is already assigned a longer retention period (in accordance with the agency's standard retention policy),the electronic computing device 110 may not need to further extend the retention period of the second video stream and accordingly will not execute the remainder of the process 400 because the longer retention period already assigned to the second video stream will be sufficient to ensure that the second video stream will be available (i.e., not deleted) for proving the trustworthiness of the first video stream captured by the untrusted camera. Alternatively, if the second video stream is marked as a non-evidentiary material, then the second video stream may be assigned a shorter retention period. In this case, the electronic computing device 110 may determine that the second video stream may be marked for deletion soon and accordingly will execute the remainder of the process 400 to determine if there is a need to extend the retention period assigned to the second video stream.

At block 440, the electronic computing device 110 detects one or more persons or objects (e.g., see FIG. 5 where persons or objects shown include persons involved in the assault incident, building 540, and dog 550) in the first video stream captured by the untrusted camera. The electronic computing device 110 may employ a video analytics engine to detect an instance of one or more persons or objects in the first video stream.

At block 450, the electronic computing device 110 determines whether the one or more persons or objects detected in the first video stream captured by the untrusted camera correlate with one or more persons or objects detected in the second video stream captured by the trusted camera. The electronic computing device 110 may similarly employ a video analytics engine to detect an instance of one or more persons or objects in the video stream. In the example shown in FIG. 5, since the building 540 and dog 550 are detected in the video stream 510 captured by the untrusted camera 515 as well as in the video stream 520 captured by the trusted camera 525, the electronic computing device 110 determines that the features of the building 540 and dog 550 detected in the video stream 510 correlate with the features of the building 540 and dog 550 detected in the video stream 520.

At block 460, the electronic computing device 110 extends the retention period assigned to the second video stream captured by the trusted camera when it is determined that the one or more persons or objects detected in the first video stream captured by the untrusted camera correlate with the one or more persons or objects detected in the second video stream captured by the trusted camera. In the example shown in FIG. 5, since the features of the building 540 and dog 550 detected in the video stream 510 correlate with the features of the building 540 and dog 550 detected in the video stream 520, the electronic computing device 110 extends a retention period assigned to the video stream 520 captured by the trusted camera 525. The electronic computing device 110 may extend the retention period in accordance with an agency's retention policy for evidentiary-based records. The electronic computing device 110 may further mark the second video stream as an evidentiary material based on its correlation with the first video stream which was previously marked as an evidentiary material. As an example, the electronic computing device 110 will extend the retention period assigned to the second video stream, such that the extended retention period does not expire until a retention period assigned to the first video stream expires. The extension of the retention period for the second video stream ensures that the second video stream will be available for proving the trustworthiness of the untrusted camera as well as to corroborate information captured corresponding to the public-safety incident 530. In accordance with some embodiments, trustworthiness of the untrusted camera may be proved as a function of amount of correlation (in particular, based on correlation between the features of persons or objects detected in the video streams) between a video stream captured by the trusted camera and a video stream captured by the untrusted camera.

On the other hand, when it is determined that the one or more persons or objects detected in the first video stream captured by the untrusted camera do not correlate with one or more persons or objects detected in the second video stream captured by the trusted camera, the electronic computing device 110 may refrain from extending the retention period assigned to the second video stream captured by the trusted camera because in this case the second video stream cannot help to prove trustworthiness of the video stream captured by the untrusted camera.

The process 400 can be similarly executed to extend retention periods of records of different data types including video, audio, and text captured by different types of data sources including surveillance cameras, body-worn cameras, mobile devices, land mobile radios, sensors, and the like. Accordingly, retention periods assigned to data types including audio, video, and text can be extended for the purpose of proving trustworthiness of data captured by different types of data sources.

While embodiments of the present disclosure are described in relation to extending retention periods based on future events or based on a need to prove trustworthiness of data captured by untrusted data sources, embodiments of the present disclosure can be similarly adapted to extend retention periods of records based on a number of other retention-related factors. As an example, retention periods of certain records may be automatically extended based on a time period during which the records were captured. For instance, crimes may happen more often in some particular time frame (e.g., 1-3 AM). In this case, records captured during this particular time frame may be retained for a longer period of time in comparison to records captured during other time frames. As another example, retention periods of certain records may be automatically extended based on locations. For instance, assume a southern part of the city needs more police attention, for example, due to current social unrest or historical crime pattern, than other parts of the city. In this case, records captured corresponding to the southern part of the city may be retained for a longer period of time in comparison to records captured corresponding to other locations. As another example, retention periods of certain records created by certain officers (e.g., based on their skill level and role, or based on their association to particular departments or agencies) may be automatically extended in comparison to records created by other officers. As another example, retention periods of certain records may be automatically extended when the records were captured during times when one or more of emotional level, stress level, or other health indicators such as heart rate associated with an officer exceed a predefined threshold. As a further example, an agency may want to scrutinize actions (e.g., vehicle stops) of a particular officer or officer group more closely for some future period of time. In this case, recordings by any users around (e.g., in proximity) the given officer or officer group may be automatically retained for a longer period of time. As a further example, records captured corresponding to a predicted route of an ongoing incident (e.g., suspect pursuit) may be automatically extended for a longer period of time. As a further example, retention periods of records captured in relation to a first vehicle (e.g., ambulance) may be automatically extended in response to extending retention periods of records captured in relation to a second vehicle (e.g., police vehicle) when the first vehicle was determined to be following a similar route (or assigned to a same incident) as the second vehicle (e.g., police vehicle). As a further example, retention periods of all records captured in relation to vehicle stops over a particular month may be automatically extended for a longer period of time in response to an agency decision to observe a vehicle stop safety month. As a further example, retention periods of all existing and future records captured by an officer or a group of officers may be automatically extended in response to an audit request to investigate professional misconduct of the officers. As a further example, retention periods of records captured in relation to a talk group user may be automatically extended for a longer period of time in response to extending retention periods of records captured in relation to another user of the same talk group. As a further example, retention periods may be automatically assigned based on event severity (e.g., records relating to murders may be retained for 90 years whereas accidental activations of body-worn cameras are retained for only 7 days). As another example, agencies may normally choose to delete video recordings immediately (or after a shortened retention period) when body-worn cameras operated by officers are accidentally activated. However, in order to identify false activations, agencies may decide to notify employees that for a given period of time, false activations will be retained to help identify the root causes for accidental activations of body-worn cameras. The notification to the employees may automatically trigger an extension in the retention periods of video recordings captured by the body-worn cameras employed by the agencies. Several other factors for extending retention periods of records exist as well.

Furthermore, while embodiments of the present disclosure are described with examples relating to data records captured corresponding to public-safety related incident scenes, embodiments of the present disclosure can be also readily adapted for non-public safety environments including press, media, utilities, retail, healthcare, manufacturing, oil/gas, electric, private security, and other business environments where there may be a need to automatically extend retention periods for different types of data records captured in such environments based on a contextual correlation with a planned or a predicted event, based on the need to prove trustworthiness of data captured by an untrusted data source, or based on various other retention-related factors.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of extending retention periods of records, the method comprising:
    identifying, at an electronic computing device, the retention period associated with a first electronically stored record;
    obtaining, at the electronic computing device, information related to a future event, the information including a time period during which the future event is predicted or scheduled to occur and a location at which the future event is predicted or scheduled to occur;
    determining, at the electronic computing device, that the first electronically stored record is contextually related to the future event based at least in part on the time period or the location of the future event;
    extending, at the electronic computing device, the retention period associated with the first electronically stored record based on the determination that the first electronically stored record is contextually related to the future event; and
    after the extended retention period expires, deleting the first electronically stored record in accordance with the extended retention period assigned to the first electronically stored record.

2. The method of claim 1, wherein extending the retention period comprises:
    assigning an extended retention period to the first electronically stored record, wherein the extended retention period does not expire until after a predefined time period after an identified occurrence date of the future event, further wherein the extended retention period is longer than the retention period previously assigned to the first electronically stored record.

3. The method of claim 2, further comprising:
    detecting an occurrence of the future event;
    analyzing data captured by one or more data sources deployed within a predefined geographical area relative to the location of the future event; and
    determining whether the analyzed data is contextually related to data included in the first electronically stored record.

4. The method of claim 3, wherein when it is determined that the analyzed data is not contextually related to data included in the first electronically stored record, the method further comprising:
    canceling the extended retention period assigned to the first electronically stored record and further reverting to the retention period previously assigned to the first electronically stored record; and
    deleting the first electronically stored record at the end of the reverted retention period.

5. The method of claim 3, wherein when it is determined that the analyzed data is contextually related to data included in the first electronically stored record, the method further comprising:
    maintaining the extended retention period assigned to the first electronically stored record; and
    deleting the first electronically stored record at the end of the extended retention period.

6. The method of claim 1, further comprising:
    identifying a data source from which data included in the first electronically stored record was captured; and
    automatically extending, in response to determining that the first electronically stored is contextually related to the future event, a retention period associated with any current and future electronically stored records including any data captured by the data source at least until after a predefined period after the occurrence of the future event.

7. The method of claim 1, further comprising:
    identifying, one or more data sources that are already deployed or assigned to be deployed within a predefined geographical area relative to the location of the future event; and
    automatically extending a retention period associated with any current and future electronically stored records including any data captured by the one or more data sources at least until after a predefined period after the occurrence of the future event.

8. The method of claim 1, further comprising:
    determining that the first electronically stored record is related to a second electronically stored record for which a retention period has previously been extended; and
    determining whether the second electronically stored record has been marked as an evidentiary material or a non-evidentiary material.

9. The method of claim 8, further comprising:
    extending the retention period associated with the first electronically stored record only when it is determined that the second electronically stored record has been marked as an evidentiary material.

10. The method of claim 8, further comprising refraining from extending the retention period associated with the first electronically stored record when it is determined that the second electronically stored record has been marked as a non-evidentiary material.

11. The method of claim 8, wherein extending the retention period comprises one of:
  extending the retention period by a first duration of time when it is determined that the second electronically stored record has been marked as an evidentiary material; or
  extending the retention period by a second duration of time shorter than the first duration of time when it determined that the second electronically stored record has been marked as a non-evidentiary material.

12. The method of claim 1, wherein determining the record is contextually related to the future event comprises:
  determining that the first electronically stored record contains data captured corresponding to a first event; and
  determining that the record is contextually related to the future event when the first event is of the same type as the future event.

13. The method of claim 1, wherein determining the record is contextually related to the future event comprises:
  determining that the first electronically stored record contains data captured corresponding to one or more persons or objects of interest; and
  determining that the record is contextually related to the future event when the one or more persons or objects of interest are predicted or scheduled to participate in the future event.

14. The method of claim 1, wherein determining the record is contextually related to the future event comprises:
  identifying a data source from which data included in the first electronically stored record was captured; and
  determining that the data source is deployed at the location of the future event.

15. The method of claim 1, wherein determining the record is contextually related to the future event comprises:
  analyzing data included in the first electronically stored record; and
  determining that the data includes one or more keywords related to the future event.

16. An electronic computing device, comprising:
  a communications interface;
  a computer-readable memory storing computer program instructions; and
  an electronic processor communicatively coupled to the memory and the communications interface, wherein the computer program instructions, when executed by the electronic processor, causes the electronic processor to:
    identify a retention period assigned to retain a first electronically stored record;
    obtain, via the communications interface, information related to a future event, the information including a time period during which the future event is predicted or scheduled to occur and a location at which the future event is predicted or scheduled to occur;
    determine that the first electronically stored record is contextually related to the future event based at least in part on the time period or the location of the future event;
    extend the retention period associated with the first electronically stored record based on the determination that the first electronically stored record is contextually related to the future event; and
    after the extended retention period expires, delete the first electronically stored record in accordance with the extended retention period assigned to the first electronically stored record.

17. The electronic computing device of claim 16, wherein the computer program instructions, when executed by the electronic processor, causes the electronic processor to:
  identify a data source from which data included in the first electronically stored record was captured; and
  automatically extend, in response to determining that the first electronically stored record is contextually related to the future event, a retention period associated with any current and future electronically stored records including any data captured by the data source at least until after a predefined period after the occurrence of the future event.

18. The electronic computing device of claim 16, wherein the computer program instructions, when executed by the electronic processor, causes the electronic processor to:
  determine that the first electronically stored record contains data captured corresponding to one or more persons or objects of interest; and
  determine that the record is contextually related to the future event when the one or more persons or objects of interest are predicted or scheduled to participate in the future event.

19. A method of extending retention periods of records, the method comprising:
  determining, at an electronic computing device, that a first video stream captured by an untrusted camera is marked as an evidentiary material, the first video stream associated with metadata identifying a time and location at which the first video stream was captured by the untrusted camera;
  identifying, at the electronic computing device, a second video stream captured by a trusted camera substantially at the same time and location at which the first video stream was captured by the untrusted camera;
  determining, at the electronic computing device, that the second video stream captured by the trusted camera is marked for deletion after a retention period assigned to the second video stream;
  detecting, at the electronic computing device, one or more persons or objects in the first video stream captured by the untrusted camera;
  determining, at the electronic computing device, whether the one or more persons or objects correlate with one or more persons or objects detected in the second video stream captured by the trusted camera;
  extending the retention period assigned to the second video stream captured by the trusted camera when it is determined that the one or more persons or objects detected in the first video stream captured by the untrusted camera correlate with the one or more persons or objects detected in the second video stream captured by the trusted camera; and
  deleting the second video stream in accordance with the extended retention period.

20. The method of claim 19, further comprising:
  refraining from extending the retention period assigned to the second video stream captured by the trusted camera when it is determined that the one or more persons or objects detected in the first video stream captured by the untrusted camera do not correlate with one or more persons or objects detected in the second video stream captured by the trusted camera.

* * * * *